June 20, 1939.  J. C. KARNES  2,162,723
SIGHTING APPARATUS
Filed Oct. 15, 1937
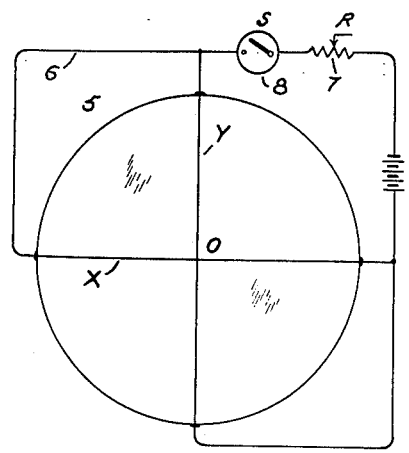
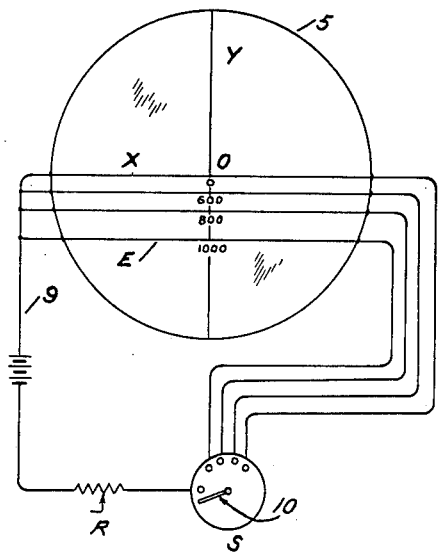
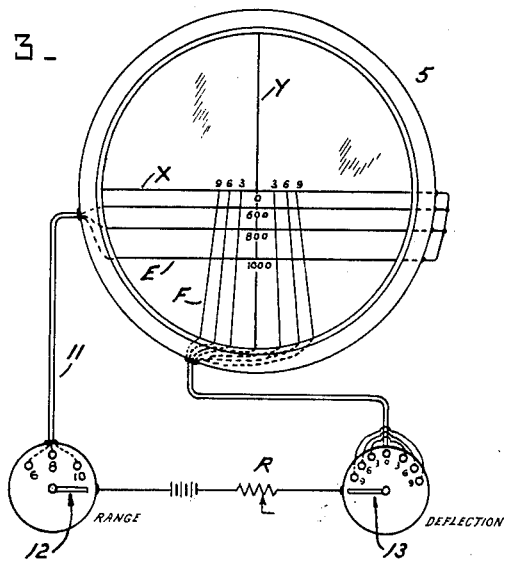
Inventor
James C. Karnes
By W. N. Roach
Attorney

33. GEOMETRICAL INSTRUMENTS.

Search Room

Patented June 20, 1939

2,162,723

UNITED STATES PATENT OFFICE 2,162,723

SIGHTING APPARATUS

James C. Karnes, Buffalo, N. Y.

Application October 15, 1937, Serial No. 169,196

2 Claims. (Cl. 33—52)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a sighting apparatus intended primarily for use with guns.

The sighting apparatus of my prior Patent No. 1,708,389 of April 9, 1929, proposes a system of wires or a reticle on a glass in an optical instrument in which intersecting wires or lines represent ranges and speeds or lateral travel of a target and interpret corresponding values of elevation and deflection which must be given the gun. These lines appear black and frequently the nature of the landscape or background and particular conditions of light and shadow produce situations in which the lines are not visible with sufficient distinctness and clarity.

The purpose of this invention is to provide a sighting apparatus in which the wires representing range and deflection may be rendered incandescent so as to insure their visibility and by selective illumination to particularly indicate the intersection that is to be used.

This arrangement also lends itself readily for the indication of data and the provision of an inexpensive and practically instantaneous data transmission system which is noiseless, which does not require adjustment and which does not include moving parts.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in elevation of a reticle glass showing an arrangement for illuminating the crosswires.

Fig. 2 is a similar view of a reticle glass having a plurality of wires representing range.

Fig. 3 is a similar view showing wires for both range and deflection.

Referring to Fig. 1 there is shown a glass plate 5 adapted to form an element of an optical instrument. The optical axis O of the instrument is indicated by the intersection or origin of a horizontal line X and a vertical line Y. These lines are provided by wires which are in exhausted cells or moulded in the plate 5. The wires are placed in an electrical circuit 6, including a rheostat 7 and a switch 8.

In Fig. 2 a plurality of horizontal wires E have been included and provide a scale indicating values of range and representing by their distance from the axis of abscissas X the elevation corresponding to range which must be given to the gun. The optical axis of O of the instrument is maintained parallel to the axis of the bore of the gun. The electrical circuit 9 includes a selector switch 10.

In Fig. 3 there has been added to the showing of Fig. 2 a corresponding system of vertically disposed wires F optically intersecting the horizontal wires E and each connected to the wire X which has only one end connected to the wires E. The wires F represent by their distance from the axis of ordinates Y the lead or deflection corresponding to the speed of a target which must be applied to the gun to compensate for the travel of the target during the time required to calculate data and the time of flight of the projectile. Since the horizontal lead varies proportionally to range the speed lines F are inclined to the axis Y, being plotted as a function of apparent speed of a target and time of flight of the projectile. The speed lines are graduated on the assumption of a target traveling at right angles to the normal plane of fire of the gun so that in selecting a speed line the apparent speed of the target as resulting from the angle of approach is the value employed.

Both the horizontal and vertical wires are placed in an electrical circuit 11 including a switch 12 for range and a switch 13 for deflection. These switches may be situated at a remote control station where the firing data is determined. The gunner merely keeps the announced target on the incandescent wire or on the intersection of the incandescent wires. Since the wires F and the lower part of wire Y are each connected to wire X, the wire X will be illuminated when the switch 13 is on any one of the contacts.

Although it is preferred to provide the wires as a reticle on the glass in an optical instrument they may be made of metal and mounted on the gun in the same manner as a front sight.

I claim:

1. In a sighting apparatus, a horizintal and a vertical wire forming axes of coordinates, a plurality of substantially vertically arranged deflection wires connected to the horizontal axis wire and representing by their distance from the vertical axis wire a value of deflection to be applied to a gun, a plurality of horizontally arranged range wires optically intersecting the vertical wires and connected to one end of the horizontal axis wire, said horizontal wires representing by their distance from the horizontal axis wire a value of range to be applied to a gun, all of said wires connected in circuit, a switch for controlling incandescence of a selected one of the horizontal range wires and a switch for controlling incandescence of a selected one of the vertical deflection wires.

2. In a sighting apparatus, an arrangement of spaced wires one of which represents an origin and the others of which represent by their distance from the origin wire data to be applied to a gun, an electrical circuit containing the wires, and a switch in said circuit for controlling incandescence of any selected one of said wires.

JAMES C. KARNES.